(12) United States Patent
Cook

(10) Patent No.: US 7,346,894 B1
(45) Date of Patent: Mar. 18, 2008

(54) METHOD AND SYSTEM FOR SPECIFYING FILE-SPECIFIC PROGRAM SETTINGS

(75) Inventor: David R. Cook, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 665 days.

(21) Appl. No.: 10/736,328

(22) Filed: Dec. 12, 2003

(51) Int. Cl.
*G06F 9/44* (2006.01)
*G06F 3/048* (2006.01)

(52) U.S. Cl. ............ 717/121; 717/122; 717/123; 717/127; 715/788; 715/789

(58) Field of Classification Search ........ 717/127–161; 715/788–807
See application file for complete search history.

(56) References Cited

U.S. PATENT DOCUMENTS

| | | | | |
|---|---|---|---|---|
| 4,819,233 | A * | 4/1989 | Delucia et al. | 717/129 |
| 5,694,561 | A * | 12/1997 | Malamud et al. | 715/805 |
| 6,314,516 | B1 * | 11/2001 | Cagle et al. | 713/1 |
| 6,825,860 | B1 * | 11/2004 | Hu et al. | 715/801 |
| 6,892,231 | B2 * | 5/2005 | Jager | 709/220 |
| 7,149,982 | B1 * | 12/2006 | Duperrouzel et al. | 715/788 |
| 7,210,131 | B2 * | 4/2007 | Schmidt et al. | 717/137 |
| 2002/0052937 | A1 * | 5/2002 | Jager | 709/220 |
| 2002/0126812 | A1 * | 9/2002 | Majewski et al. | 379/114.03 |
| 2003/0221167 | A1 * | 11/2003 | Goldstein et al. | 715/513 |

OTHER PUBLICATIONS

Kataria et al., Window rip-up for faster testing and fault tolerance in FPGAs, IEEE; 2001 pp. 149-158.*
Huakng et al., An Image Resizing IC doe Multiple Window Display, IEEE, May-Jun. 2, 1995, pp. 214-218.*
A heterogeneous distributed file system, Pinkerton, C.B.; Lazowska, E.D.; Notkin, D.; Zahorjan, J., Distributed Computing Systems, 1990. Proceedings., 10th International Conference on, May 28-Jun. 1, 1990, IEEE, pp. 424-431 □□.*
Towards a national collaboratory: an Internet file system, Rao, H.C., Systems Integration, 1992. ICSI '92., Proceedings of the Second International Conference on, Jun. 15-18, 1992, IEEE pp. 489-498 □□.*
A virtual file system for source program editing, Atsushi, Y.; Naoki, F., Software Engineering Conference, 2002. Ninth Asia-Pacific, 2002, IEEE, pp. 176-183 □□.*

* cited by examiner

*Primary Examiner*—Wei Zhen
*Assistant Examiner*—Satish S Rampuria

(57) ABSTRACT

Methods and systems for specifying settings used by a file are described. A file is accessed using a software application. Associated with the file are global settings defined by the application. The application automatically imposes the global settings on all files associated with the application. However, a file-specific setting is defined for the file and saved. The file-specific setting replaces a corresponding global setting defined by the application for the file. The global settings for other files associated with the application are not affected by the file-specific setting. The file-specific setting is used instead of the corresponding global setting upon subsequent accessing of the file.

28 Claims, 3 Drawing Sheets

METHOD AND SYSTEM FOR SPECIFYING FILE-SPECIFIC PROGRAM SETTINGS

FIELD OF THE INVENTION

Embodiments of the present invention generally relate to computer systems. More specifically, embodiments of the present invention relate to software applications and files used by computer systems.

BACKGROUND ART

Computer users can select from a wide variety of software applications such as applications for word processing, database management, Web browsing and so on. These applications can be used to create, operate on and/or save files in many different formats.

Many of these applications have features intended to assist the user. Many of those features can be turned on and off by the user in a relatively straightforward manner. However, while intended as aids, these features can sometimes frustrate users.

For example, consider a conventional word processing application that has a spell-check function. A user can turn on the spell-check function so that spelling is automatically checked while the user is typing. The spell-check function is implemented as a generic or global setting, and when turned on is imposed by the word processing application on all files created or accessed using the application. This can be troublesome for a user that receives a word processing document from another person via electronic mail, for example. The user may only be interested in reading the document and probably has little or no interest in correcting spelling or grammar errors in the document. However, when the user opens the document and has the automatic spell-check function turned on, the document is automatically spell-checked. The user can turn off the spell-check function, but then must turn it back on again to re-enable that function for other documents.

Other automatic settings imposed by conventional software applications can be just as troublesome. For example, in a windows-based operating system, the contents of a file (such as a word processing file) are displayed in a window. The size and on-screen position of the window depend on the application that is used to open the file. Some applications use the same size window in the same screen position for all files. This can be troublesome because the default size may not be appropriate for all files. The user must therefore adjust the window size each time a file is opened.

Other applications apply the same window size and position that were in use the last time the application was used. That is, if for example the user opens a file using a particular application, then reduces the window size and closes the file, the reduced window size will be applied to the next file that is opened using that application. The reduced window size may not be appropriate for the second file, so the user must increase the window size accordingly. Should the user reopen the first file, the larger window size will be applied, so once again the user must adjust the window size.

These represent a few examples in which settings imposed globally by applications turn out to be troublesome to users. Software vendors have either ignored these problems or developed workarounds that may also prove troublesome. For example, as mentioned above, software vendors have made it possible to turn features off and on and to resize and reposition windows, but the user is forced to perform the same actions over and over. Some users may find this annoying, while other users may simply tolerate the inconvenience paradoxically introduced by features intended to assist users.

SUMMARY OF THE INVENTION

In summary, global settings invoked by software applications can be problematic in some instances. Accordingly, a system and/or method that can make file settings more flexible and convenient would be advantageous. The present invention provides these and other advantages.

Embodiments of the present invention pertain to methods and systems for specifying program settings and/or options (e.g., preferences) on a per-file basis. In one embodiment, a file is accessed using a software application. Associated with the application are global settings (e.g., options, preferences) that are applied to the file. The application automatically imposes the global settings on all files associated with the application. However, a file-specific setting is defined for the file and saved. The file-specific setting replaces a corresponding global setting defined by the application for the file. The global settings for other files associated with the application are not affected by the file-specific setting. The file-specific setting is used instead of the corresponding global setting upon subsequent accessing of the file. In one embodiment, the file-specific setting is loaded along with the file and overrides the corresponding global setting when the file is accessed.

A file-specific setting can be any program option, setting or preference. Examples of file-specific settings include, but are not limited to, display window size and display window position. In another example, a file-specific setting identifies the page in a multi-page document that was last being displayed when the file was closed, so that the page can be readily restored to view when the file is next accessed.

A file-specific setting can be saved with the content of the file. Alternatively, a file-specific setting can be saved separate from the content of the file, in a registry that may be organized by file name, or in another reference file, for example. In one embodiment, the registry includes file-specific settings on a per-file basis, with file-specific settings sorted according to their associated software application in a hierarchical arrangement. In one such embodiment, a file-specific setting is associated with the file name, and the file-specific setting is indexed using the file name. File-specific settings may also be associated with a Web page, in which case the file-specific settings are indexed using the Uniform Resource Locator for the Web page.

In another embodiment, a file-specific setting is derived from the content of the file. In one more embodiment, the file name of the file includes a string of characters that invoke a file-specific setting. For example, the name of a text file could include a string of characters that identifies that the display window associated with that file should have a certain size (e.g., width) so that the format of the text is properly captured in the display. File-specific settings can also be applied to a class of files that, in one embodiment, is specified by a user. For example, the user can impose file-specific settings on all files with a certain extension, on all files that include a certain character or string of characters in their name, or on all files that are placed in a certain file directory.

In summary, embodiments of the present invention provide a user-friendly mechanism that conveniently allows file settings to be made and retained on a file-by-file basis. These and other objects and advantages of the various embodiments of the present invention will become recognized by those of ordinary skill in the art after having read the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

Figure 1:
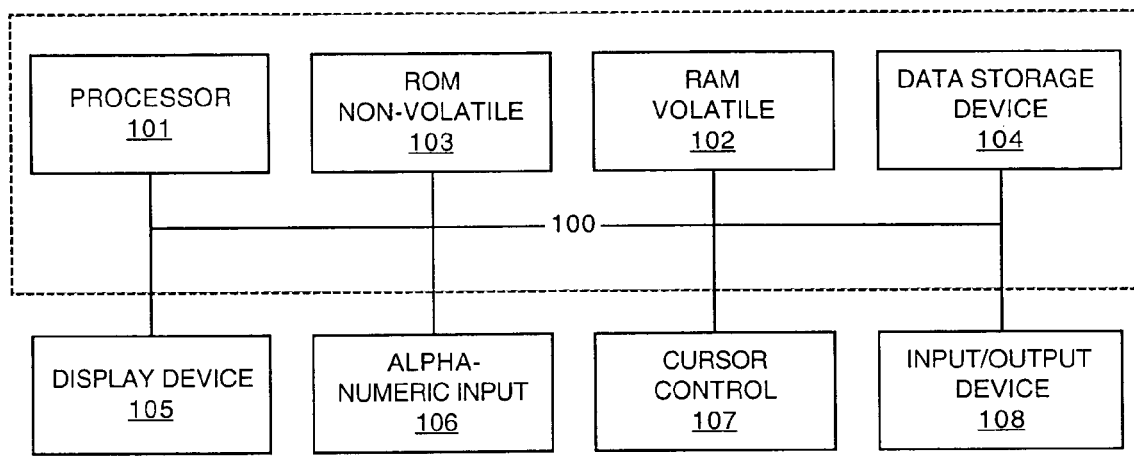
FIG. 1 is a block diagram of an exemplary computer system upon which embodiments of the present invention can be implemented.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "saving," "closing," "replacing," "overriding," "associating," "executing," "displaying," "identifying," "opening," "deriving," "invoking" or the like, refer to actions and processes (e.g., flowchart 400 of FIG. 4) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

FIG. 1 is a block diagram of an exemplary computer system 112 upon which embodiments of the present invention can be implemented. Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 also includes a display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes a cursor control or directing device 107 coupled to bus 100 for communicating user input information and command selections to central processor 101. Computer system 112 also includes signal communication interface (input/output device) 108, which is also coupled to bus 100. Communication interface 108 can also include wireless communication mechanisms.

Using the cursor control or directing device 107, a graphical user interface element displayed on display device 105 can be selected and activated. For example, the cursor control or directing device 107 may be a mouse, in which case the graphical user interface element is selected/activated by using the mouse to position an on-screen cursor over (on or in) the element, and then depressing a button on the mouse (this process is referred to herein as "clicking").

It is appreciated that computer system 112 described herein illustrates an exemplary configuration of an operational platform. Nevertheless, other computer systems with differing configurations can also be used in place of computer system 112 within the scope of the present invention. These other types of computer systems can include workstations and thin client devices that are coupled to other computer systems in a distributed computer system network. Computer system 112 may be any type of computing device, such as but not limited to a personal computer, a game console, a personal digital assistant, etc.

Figure 2:
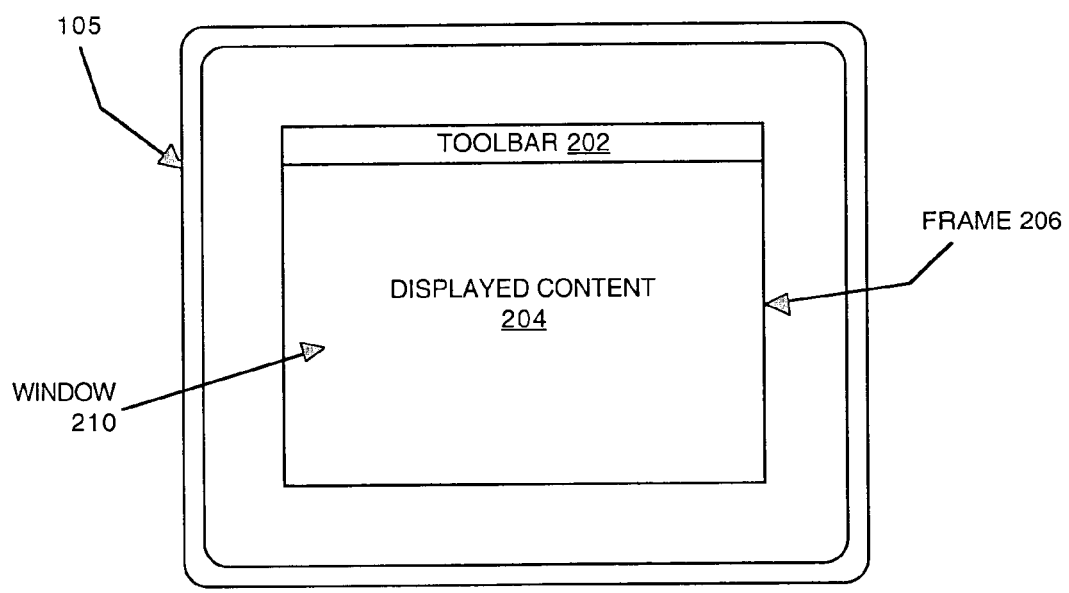
FIG. 2 illustrates a window displayed on a display device according to one embodiment of the present invention.

FIG. 2 illustrates a window 210 for a file that is opened and displayed on a display device 105 according to one embodiment of the present invention. In the present embodiment, window 210 is defined by frame 206. Within frame 206 are toolbar 202 and displayed content 204. There may be other GUI elements associated with window 210. For example, there may be title bar appearing above toolbar 202, and there may be one or more rows of menu items between the title bar and the toolbar 202. Toolbar 202 and any other GUI elements can be positioned virtually anywhere within window 210.

In general, toolbar 202 is a graphical user interface (GUI) element that facilitates user interaction with the software application or Web page associated with window 210.

In general, displayed content 204 represents a user-viewable/readable display of the contents of a file or files; for example, a data file or a text file such as a file created by and used with a software application such as, but not limited to, a word processing application, a spreadsheet (e.g., database) application, and an electronic mail application, or files that are associated with the content of a Web page. For a word processing application, displayed content 204 would include text-based content, for example. For a Web browser application, displayed content 204 would include a Web page, for example.

The application associated with window 210 controls the content of displayed content 204. The contents of toolbar 202 and any other GUI elements (e.g., title bar and menus) are also under control of the application associated with window 210. However, certain aspects of toolbar 202, such as the color and resolution of the display, are generally under control of the operating system.

Embodiments of the present invention allow program or file settings to be specified and retained on a file-by-file basis. In general, embodiments of the present invention pertain to settings that can be invoked on a file-by-file basis in lieu of global settings that are applied by an application program across multiple files (e.g., by default). In particular, embodiments of the present invention invoke file-specific settings without affecting the global settings applied by the application program to other files.

From one perspective, the present invention, in its various embodiments, allows global settings to continue to function as global settings, as they were intended; however, on a file-by-file basis, a file-specific setting can be substituted for a global setting and supersedes the global setting. Global settings continue to perform their respective functions for files in which the global setting has not been superseded.

File-specific settings introduced according to embodiments of the present invention include settings associated with, for example:

the size and position of a window (e.g., window 210) on a display screen (e.g., display device 105);

the last (most recent) page in a multi-page file that was being viewed when the file and/or the application associated with the file was closed; and user-selected options such as spell-check that are conventionally invoked by an application for all files associated with the application.

These examples are discussed more fully below. Although embodiments of the present invention are discussed in the context of these examples, the present invention is not limited to these examples and can be applied to any program setting, option and/or preference.

According to an embodiment of the present invention, the size and/or position of the display window can be different from one file to the next, even when the files are associated with the same software application. When a file is created or is subsequently opened (e.g., displayed), the size of the display window can be increased or decreased by the user in order to accommodate the displayed content 204. For example, one file associated with a particular application may contain two columns of text, while another file associated with that application may contain only one column of text. Accordingly, a user may increase the width of the display window for the first file so that both columns may be viewed side-by-side, but may leave the width of the display window for the second file unchanged.

According to one embodiment of the present invention, the size of the display window for a same application is retained on a file-by-file basis. That is, the window size associated with the aforementioned first file is retained for that file, so that each time the first file is opened, it is displayed in a window specifically sized for it. Also, the window size associated with the aforementioned second file is retained for that file, so that each time the second file is opened, it is displayed in a window specifically sized for it. Thus, even though the first and second files are both associated with the same application, they each can have a different sized display window that is automatically applied each time they are opened.

Furthermore, changing the window size associated with one file does not affect the window size associated with the other file, even though both files are associated with the same application. In a similar manner, the position of the display window on the display screen can be specified and retained on a file-by-file basis. Thus, each time a file is opened, a user does not need to resize and/or reposition the window associated with that file.

In one embodiment, the user performs some type of deliberate action so that window size and/or position for each file is retained. For example, after adjusting the window size and/or position as desired, the user can click on a menu item using the mouse, or the user can use a key or combination of keys on the keyboard, to save information that describes the window size and position. In another embodiment, information describing the size and position of the display window in use when the file and/or the associated application is closed is automatically saved at that point.

A similar type of approach can be implemented when a user wants to restore the last (most recent) page viewed by the user in a multi-page document or file. With some applications, multi-page files are presented in a page-by-page fashion, with pages demarcated from each other in some fashion. In other applications, multi-page documents are rendered in a continuous fashion (that is, there is no apparent demarcation between pages).

According to an embodiment of the present invention, some portion of the file is identified when the file and/or application is closed, so that the next time the file is accessed, that same portion of the file will be displayed. For example, the portion of the file appearing as displayed content 204 of FIG. 2 is identified when the file and/or application is closed. The next time the file is opened, that same portion is initially displayed. As a specific example, if the user is viewing page 14 of a document when the document is closed, the next time the document is opened, page 14 of the document is automatically displayed first.

There may be instances in which the cursor is in a position that does not coincide with the portion of the file being displayed (e.g., the cursor is in a portion of a document not visible in displayed content 204). The user can indicate a preference as to which portion of the document is to be first displayed when the file is opened. For example, according to the user's preference, either the portion being displayed or the portion around the cursor is identified when the file and/or application is closed. The portion so identified is automatically displayed the next time the file is opened.

In one embodiment, the user performs some type of deliberate action to identify the portion of a file to be displayed when the file is opened. For example, after displaying a portion of the file that is of interest, or after positioning the cursor within the file at a point of interest, the user can click on a menu item using the mouse, or the user can use a key or combination of keys on the keyboard, to identify that position within the file. In this manner, information identifying multiple points of interest can be retained for each file. The most recent point of interest is automatically displayed the next time the file is opened, and the user can navigate to other points of interest using menus, other types of GUI elements, or keyboard entries. In another embodiment, information identifying the portion of the file being displayed, or information identifying the position of the cursor within the file (depending on the user preference as mentioned above), is automatically saved when the file and/or the associated application is closed.

Thus, when a file is opened, it displays a page or position designated by the user, either implicitly or explicitly, instead of automatically displaying the first page or foremost portion of the file. Also, different files can be opened to different pages or portions, even when those files are associated with the same application. Accordingly, each time a file is opened, the user does not need to search through the file to find a particular point of interest. This can be particularly advantageous for larger files, or in those instances in which a file or application is inadvertently or unexpectedly closed (e.g., due to the computer system losing power).

According to another embodiment of the present invention, a user-selected global setting that is automatically imposed on all files associated with a particular application can be replaced by or overridden with a file-specific setting. For example, a feature such as spell-check can be turned on or off globally and applied to all files associated with a particular application. In accordance with the present invention, the spell-check feature can also be turned on or off on a file-by-file basis, without affecting other files associated with the same application. Features other than spell-check can be treated in a similar manner. In addition, features can be turned on as well as turned off on a file-specific basis.

To summarize, embodiments of the present invention allow file settings to be specified and retained on a file-by-file basis, even when the files are associated with the same software application. A global setting invoked by a software application for all files associated with the application can be replaced with a file-specific setting without affecting the settings of other files associated with the application. A file-specific setting can be automatically retained or it can be retained in response to deliberate user action.

There are other mechanisms that can be employed to specify and invoke file-specific settings. In one embodiment, characteristics of the file content can be used to infer or invoke a file-specific setting. In other words, the content of the file can affect the file-specific setting. Note that this is distinguishable from the case in which a file-specific setting affects the content of a file. For example, a word processing application can specify different fonts for different documents. The font setting affects the content of the data in the word processing file and is distinguishable in that respect from the present embodiment of the present invention.

To illustrate the above, consider the example of a text-based file that has two or more columns of text that are preferably displayed side-by-side and therefore requires a display window wider than that required by another file that has only a single column of text. When such a file is opened, the associated software application can deduce that there are multiple columns, for example by checking formatting cues (such as carriage returns) embedded in the file. According to the present embodiment of the present invention, the display window is automatically sized so that it is wide enough to allow the columns to be displayed side-by-side. Using the same approach, another file associated with the same software application, but having only a single column of text, would be automatically opened in a narrower display window. Thus, even though these two files are associated with the same software application, they can be displayed in different sized display windows without user intervention.

In another embodiment, the name of the file includes a character or a string of characters that identifies a file-specific setting. The character or string of characters would be in addition to the file extension normally assigned by the software application associated with the file. Consider the above example of a file that includes multiple columns of text. According to the present embodiment, the file name would include a string (e.g., a string such as "2col") that identifies that the display window needs to be wide enough to accommodate two columns of text. A file name containing such a character string can be assigned by the user or automatically assigned by the software application.

File-specific settings can also be applied to a class of files that, in one embodiment, is specified by a user. For example, the user can impose file-specific settings on all files with a certain extension, on all files that include a certain character or string of characters in their name, or on all files that are placed in a certain file directory. In the case of Web pages, a class can be specified according to some subset of the Uniform Resource Locator (URL) for the Web pages. The settings are file-specific in the sense that they are only applied to certain files selected by the user, and that they can be turned off or on without affecting the settings of other files not in this class of files. Furthermore, these file-specific settings are distinguishable from the global settings imposed by an application, in that these file-specific settings are imposed by the user instead of by the application, and in that these file-specific settings can be applied to a selected group of files associated with the application instead of to all files associated with the application.

File-specific settings for a file can be saved in memory along with the content of that file. Alternatively, file-specific settings can be saved separately from the file content, in a registry or in another reference file, for example. In the latter cases, the file-specific settings can be associated with the appropriate file using the file name as an index. An embodiment in which file-specific settings are saved in a registry indexed by file name is described in conjunction with FIG. 3.

Importantly, the present invention, in its various embodiments, is not limited in application to text files or data files only, for example. Embodiments of the present invention can also be used with files associated with Web pages. For example, a user may wish that a Web page be opened and displayed within a certain size window in a certain position on the display screen. File-specific settings can be specified to accomplish this in a manner similar to that previously described herein. In the case of a Web page, file-specific settings that are saved in a registry or in another reference file can be indexed using the URL for the Web page.

Figure 3:
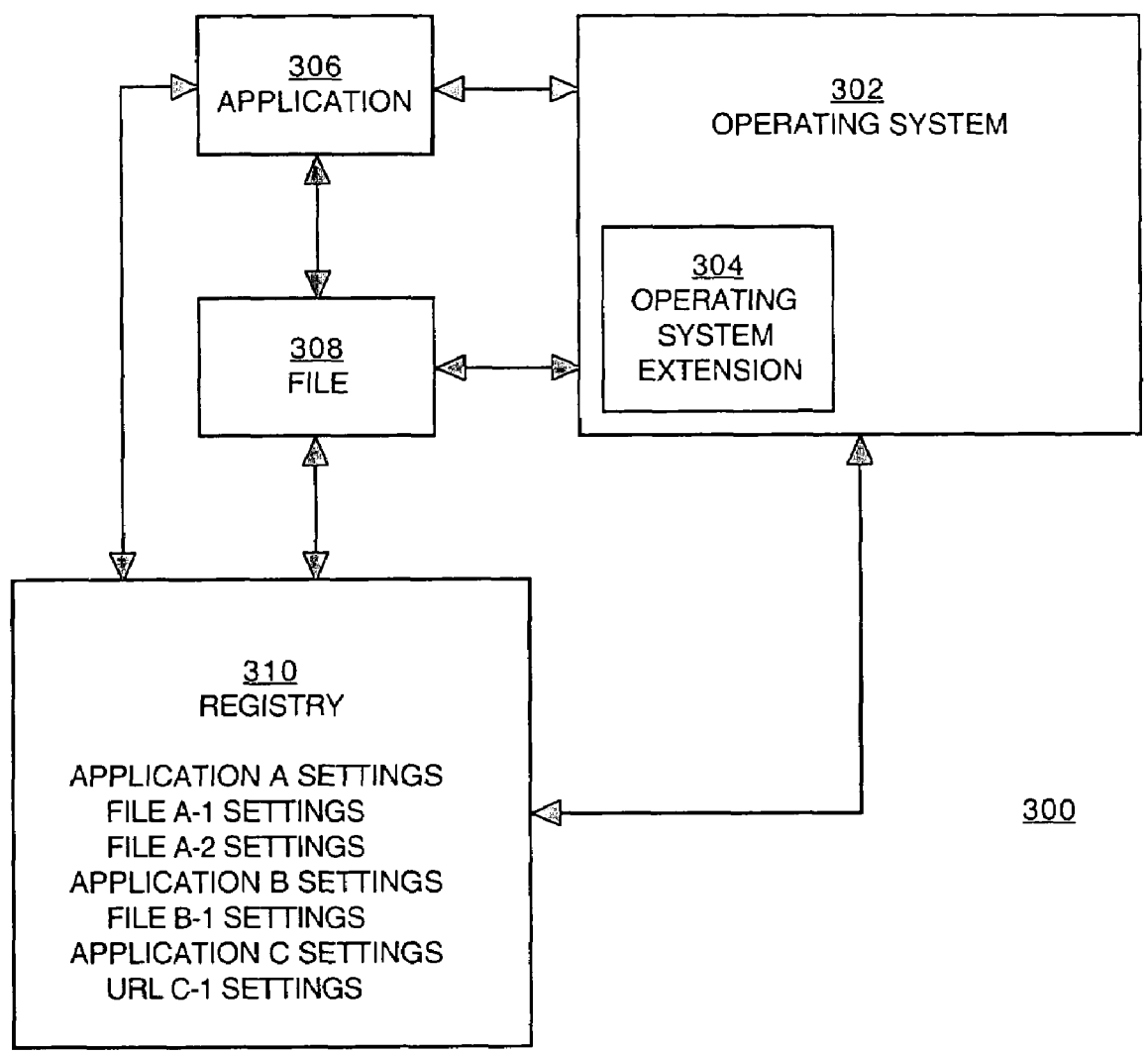
FIG. 3 is a data flow diagram showing software elements that can be used to implement embodiments of the present invention.

FIG. 3 is a data flow diagram 300 showing various software elements that can be used to implement embodiments of the present invention. In the present embodiment, the present invention is implemented as an operating system extension 304 to operating system 302. Alternatively, features of the present invention can be built into software application 306. In the example of FIG. 3, file 308 is a file that is associated with application 306.

Consider again the example in which window size and position is defined on a file-specific basis. The capability to define a file-specific window size and position in the manner previously described herein could be implemented using operating system extension 304. That is, operating system extension 304 would see to it that information describing the window size and position specified for file 308 is captured and retained. Operating system extension 304 would also see to it that a global setting imposed by application 306 on file 308 is overridden by a file-specific setting associated with file 308. Alternatively, these capabilities can be built into application 306.

In the present embodiment, file-specific settings for files are retained in registry 310, separately from the content of the files. As mentioned above, file-specific settings can instead be retained with the file (e.g., as part of the file content), or file-specific settings can be retained in another reference file.

In one embodiment, registry 310 has a hierarchical arrangement in which file-specific settings are indexed by file name and sorted by software application. For Web pages, file-specific settings are indexed by URL. Registry 310 can also include global settings associated with each application.

In the example of FIG. 3, files A-1 and A-2 are associated with application A, and file B-1 is associated with application B. File A-1 settings are file-specific settings associated with file A-1; file A-2 settings are file-specific settings associated with file A-2; and file B-1 settings are file-specific settings associated with file B-1. Application A settings are globally invoked for files associated with application A (e.g., files A-1 and A-2), and application B settings are globally invoked for files associated with application B. Application C is a Web browser application. Application C settings are globally invoked for all Web pages accessed using application C, and URL C-1 settings are file-specific settings associated with a Web page identified by and accessed using URL C-1.

In operation, the example of FIG. 3 performs as follows. Application 306 (e.g., application A) is launched and identified by operating system 302. Operating system 302 (perhaps operating system extension 304) checks the registry 310 for global settings invoked by application A. A file 308 (e.g., file A-1) is opened (note that the opening of file A-1 can cause the launching of application A). File A-1 is identified by operating system 302 (e.g., operating system extension 304), which checks the registry 310 to determine if there are file-specific settings associated with file A-1. Application A settings are replaced or overridden by corresponding file A-1 settings. That is, for example, if the application A settings include a global setting for window size, and the file A-1 settings also include a setting for window size, then the file A-1 setting would be used in lieu of the application A setting.

A similar approach is followed when a Web page is accessed. For example, the user launches the Web browser (application C) and enters URL C-1. Operating system 302 (e.g., operating system extension 304) checks the registry 310 to determine if there are file-specific settings associated with URL C-1. Application C settings are replaced or overridden by corresponding URL C-1 settings.

Figure 4:
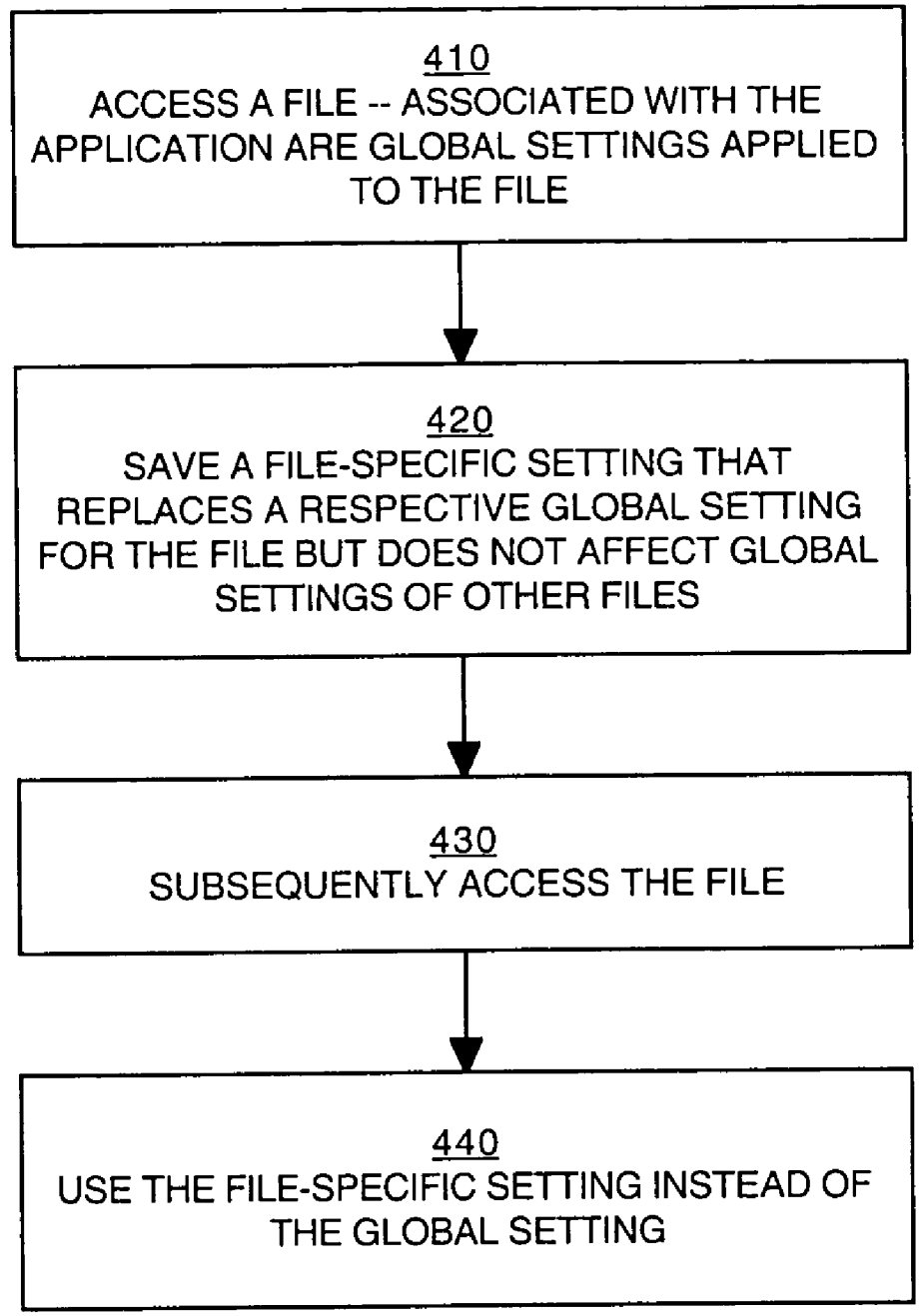
FIG. 4 is a flowchart of a computer-implemented method for specifying file settings in accordance with one embodiment of the present invention.

FIG. 4 is a flowchart 400 of a method for specifying file-specific settings in accordance with one embodiment of the present invention. Although specific steps are disclosed in flowchart 400, such steps are exemplary. That is, the present invention is well suited to performing various other steps or variations of the steps recited in flowchart 400. It is appreciated that the steps in flowchart 400 may be performed in an order different than presented and that the steps in flowchart 400 are not necessarily performed in the sequence illustrated. In one embodiment, flowchart 400 is implemented as program instructions stored in computer-readable memory units of computer system 112 and executed by processor 101 (FIG. 1).

In step 410 of FIG. 4, in the present embodiment, a file is accessed using a software application. The file may be, but is not limited to, a data file or a file associated with a Web page. The software application may be, but is not limited to, a word processor, a spreadsheet or a Web browser. Associated with the application are global settings that are applied to the file. The application automatically imposes the global settings on all files associated with the application.

In step 420, a file-specific setting is defined for the file and saved. The file-specific setting replaces a corresponding global setting defined by the application for the file. The global settings for other files associated with the application are not affected by the file-specific setting. The file-specific setting can be saved with the content of the file. Alternatively, the file-specific setting can be saved separate from the content of the file, in a registry or in another reference file, for example. In another embodiment, a file-specific setting is derived from the content of the file. In one more embodiment, the file name of the file includes a string of characters that invoke a file-specific setting.

In step 430, the file is subsequently accessed. In step 440, the file-specific setting is used instead of the corresponding global setting. In one embodiment, the file-specific setting overrides the corresponding global setting when the file is accessed.

In summary, embodiments of the present invention provide a user-friendly mechanism that conveniently allows file settings to be made and retained on a file-by-file basis. Settings can be defined and invoked on a file-by-file basis without affecting global settings defined for other files.

Embodiments of the present invention, method and system for specifying file-specific program settings, are thus described. While the present invention has been described in particular embodiments, it should be appreciated that the present invention should not be construed as limited by such embodiments, but rather construed according to the below claims.

What is claimed is:

1. A method of specifying settings used with a file, said method comprising:
   opening said file using a software application, wherein associated with said file are global settings that are applied to said file when contents of said file are rendered for display, said application automatically imposing said global settings on all files associated with said application by default, wherein said file is rendered in a first window having a first size and a first position in a display screen;
   saving a file-specific setting defined for said file, wherein said global settings for other said files associated with said application are unchanged by said file-specific setting, wherein said file-specific setting establishes at least one of a second size and second position for a window, said second size and said second position different from said first size and said first position;
   closing said file; and
   upon subsequent opening of said file, applying said file-specific setting to said display of said contents of said file, said file-specific setting superseding a corresponding global setting for said file, wherein as a result of said file-specific setting said file is rendered in a second window having at least one of said second size and said second position in said display screen.

2. The method of claim 1 further comprising:
   accessing said file; and
   overriding said corresponding global setting with said file-specific setting.

3. The method of claim 1 further comprising saving said file-specific setting with said contents of said file.

4. The method of claim 1 further comprising:
   associating said file-specific setting with said file; and
   saving said file-specific setting separate from said contents of said file.

5. The method of claim 4 wherein said file-specific setting is saved in a registry, wherein said registry comprises a hierarchical arrangement of application-specific global settings and file-specific settings.

6. The method of claim 1 wherein said file-specific setting is associated with the file name of said file, and wherein said file-specific setting is indexed using said file name.

7. The method of claim 6 wherein said file is associated with a Web page and said file name comprises a Uniform Resource Locator.

8. The method of claim 1 wherein said file-specific setting is derived from said contents of said file.

9. The method of claim 1 wherein the file name of said file comprises a string of characters that invoke said file-specific setting.

10. The method of claim 1 wherein said file comprises multiple pages for display by said application, wherein said file-specific setting comprises identification of a page last displayed when said file was closed.

11. A computer-readable medium having computer-executable components for specifying settings used with a file, said components comprising:
    a software application for opening said file, wherein associated with said file are global settings that are applied to said file when contents of said file are rendered for display, said application automatically imposing said global settings on all files associated with said application by default, wherein said file is rendered in a first window having a first size and a first position in a display screen;
    a software storage element for saving a file-specific setting defined for said file while said file is closed, said file-specific setting replacing a corresponding global setting defined by said application for said file, wherein said global settings for other said files associated with said application are unchanged by said file-specific setting, said file-specific setting establishing at least one of a second size and second position for a window, said second size and said second position different from said first size and said first position, and wherein upon subsequent opening of said file said file-specific setting is applied to said display of said contents instead of said corresponding global setting, wherein as a result of said file-specific setting said file is rendered in a second window having at least one of said second size and said second position in said display screen.

12. The computer-readable medium of claim 11 wherein said corresponding global setting is overridden with said file-specific setting.

13. The computer-readable medium of claim 11 wherein said file comprises said storage element so that said file-specific setting is saved with said contents of said file.

14. The computer-readable medium of claim 11 wherein said storage element comprises a reference file, wherein said file-specific setting is saved separate from said contents of said file.

15. The computer-readable medium of claim 14 wherein said storage element comprises a registry, wherein said registry comprises a hierarchical arrangement in which file-specific settings are sorted by application.

16. The computer-readable medium of claim 11 wherein said storage element is associated with the file name of said file, and wherein said storage element is indexed using said file name.

17. The computer-readable medium of claim 16 wherein said file is associated with a Web page and said file name comprises a Uniform Resource Locator.

18. The computer-readable medium of claim 11 wherein said file-specific setting is derived from said contents of said file.

19. The computer-readable medium of claim 11 wherein the file name of said file comprises a string of characters that invoke said file-specific setting.

20. The computer-readable medium of claim 11 wherein said file comprises multiple pages for display by said application, wherein said file-specific setting comprises identification of a page last displayed when said file was closed.

21. A method of establishing settings for a file, said method comprising:
    opening said file, said file associated with a software application, said application imposing global settings on all files associated with said application by default when contents of said file are rendered for display, wherein said file is rendered in a first window having a first size and a first position in a display screen;
    overriding a global setting associated with said application and applied to said file with a file-specific setting defined for said file, wherein said global settings for other said files associated with said application are unchanged by said overriding, wherein said file-specific setting establishes at least one of a second size and second position for a window, said second size and said second position different from said first size and said first position;
    closing said file; and
    reopening said file with said file-specific setting in use in lieu of said global setting, wherein said reopening comprises applying said file-specific setting during said display of said contents, and wherein as a result of said file-specific setting said file is rendered in a second window having at least one of said second size and said second position in said display screen.

22. The method of claim 21 wherein said file-specific setting is saved with said contents of said file.

23. The method of claim 21 wherein said file-specific setting is saved separate from said contents of said file.

24. The method of claim 23 wherein said file-specific setting is saved in a registry, wherein said file-specific setting is indexed in said registry using said file name.

25. The method of claim 24 wherein said file is associated with a Web page and said file name comprises a Uniform Resource Locator.

26. The method of claim 21 wherein said file-specific setting is derived from said contents of said file.

27. The method of claim 21 wherein the file name of said file comprises a string of characters that invoke said file-specific setting.

28. The method of claim 21 wherein said file comprises multiple pages for display, and wherein said file-specific setting comprises identification of a page last displayed when said file was closed.

* * * * *